US011920318B2

(12) United States Patent
Madden et al.

(10) Patent No.: US 11,920,318 B2
(45) Date of Patent: Mar. 5, 2024

(54) DETECTING AND ALLEVIATING FLOODING AND BLOCKED STORM SEWERS

(71) Applicant: ObjectVideo Labs, LLC, Tysons, VA (US)

(72) Inventors: Donald Gerard Madden, Columbia, MD (US); Dana Eubanks, Herndon, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 573 days.

(21) Appl. No.: 17/184,053

(22) Filed: Feb. 24, 2021

(65) Prior Publication Data
US 2021/0262188 A1 Aug. 26, 2021

Related U.S. Application Data

(60) Provisional application No. 62/980,597, filed on Feb. 24, 2020.

(51) Int. Cl.
*E02D 29/14* (2006.01)
*F21V 23/04* (2006.01)
*G01F 23/00* (2022.01)
*G01F 23/62* (2006.01)
*G01S 19/01* (2010.01)
*H04L 67/12* (2022.01)

(52) U.S. Cl.
CPC ..... *E02D 29/1436* (2013.01); *E02D 29/1409* (2013.01); *E02D 29/1481* (2013.01); *F21V 23/0471* (2013.01); *G01F 23/0007* (2013.01); *G01F 23/62* (2013.01); *G01S 19/01* (2013.01); *H04L 67/12* (2013.01)

(58) Field of Classification Search
CPC ............ E02D 29/1409; E02D 29/1436; E02D 29/1481; F21V 23/0471; G01F 23/0007; G01F 23/62; G01S 19/01; H04L 67/12
USPC ........................................................ 404/25
See application file for complete search history.

(56) References Cited

U.S. PATENT DOCUMENTS

| | | | | |
|---|---|---|---|---|
| 1,955,018 A | * | 4/1934 | Rego | E02D 29/14 340/626 |
| 2,025,839 A | * | 12/1935 | Woods, Jr. | E02D 29/14 49/34 |
| 3,712,009 A | * | 1/1973 | Campagna | E02D 29/14 52/198 |
| 4,514,931 A | * | 5/1985 | Beck | E02D 29/14 49/21 |
| 5,028,320 A | * | 7/1991 | Gaudin | E03F 5/0405 210/248 |
| 5,062,735 A | * | 11/1991 | Gaudin | E02D 29/14 210/164 |
| 5,511,575 A | * | 4/1996 | Andenmatten | F16K 15/066 251/83 |
| 6,350,081 B1 | * | 2/2002 | Khajavi | E02D 29/1436 49/21 |

(Continued)

Primary Examiner — Raymond W Addie
(74) Attorney, Agent, or Firm — Fish & Richardson P.C.

(57) ABSTRACT

A device for detecting and alleviating flooding and blocked storm sewers includes a manhole cover coupled to a float body. The device also includes a canister having a drain hole and a valve. The device also includes multiple guides that can catch onto part of a sewer. The device is configured such that when water flows into the canister, the manhole cover, float body, and guides rise and the valve is opened.

20 Claims, 8 Drawing Sheets

(56) References Cited

U.S. PATENT DOCUMENTS

| | | | | |
|---|---|---|---|---|
| 6,551,015 | B1* | 4/2003 | Khajavi | E02D 29/1436 49/21 |
| 7,712,995 | B2* | 5/2010 | Stadler | E02D 29/1436 404/72 |
| 8,714,867 | B1* | 5/2014 | Vrondran | E02D 29/14 404/25 |
| 8,851,789 | B2* | 10/2014 | Bax | E02D 29/14 404/25 |
| 10,208,884 | B2* | 2/2019 | Honeyball | E01C 13/083 |
| 10,934,667 | B2* | 3/2021 | Kirk | E02F 5/20 |
| 11,124,958 | B1* | 9/2021 | Gagliardi | E03F 5/0403 |
| 2019/0358564 | A1* | 11/2019 | DiLalla | E03F 5/0404 |

\* cited by examiner

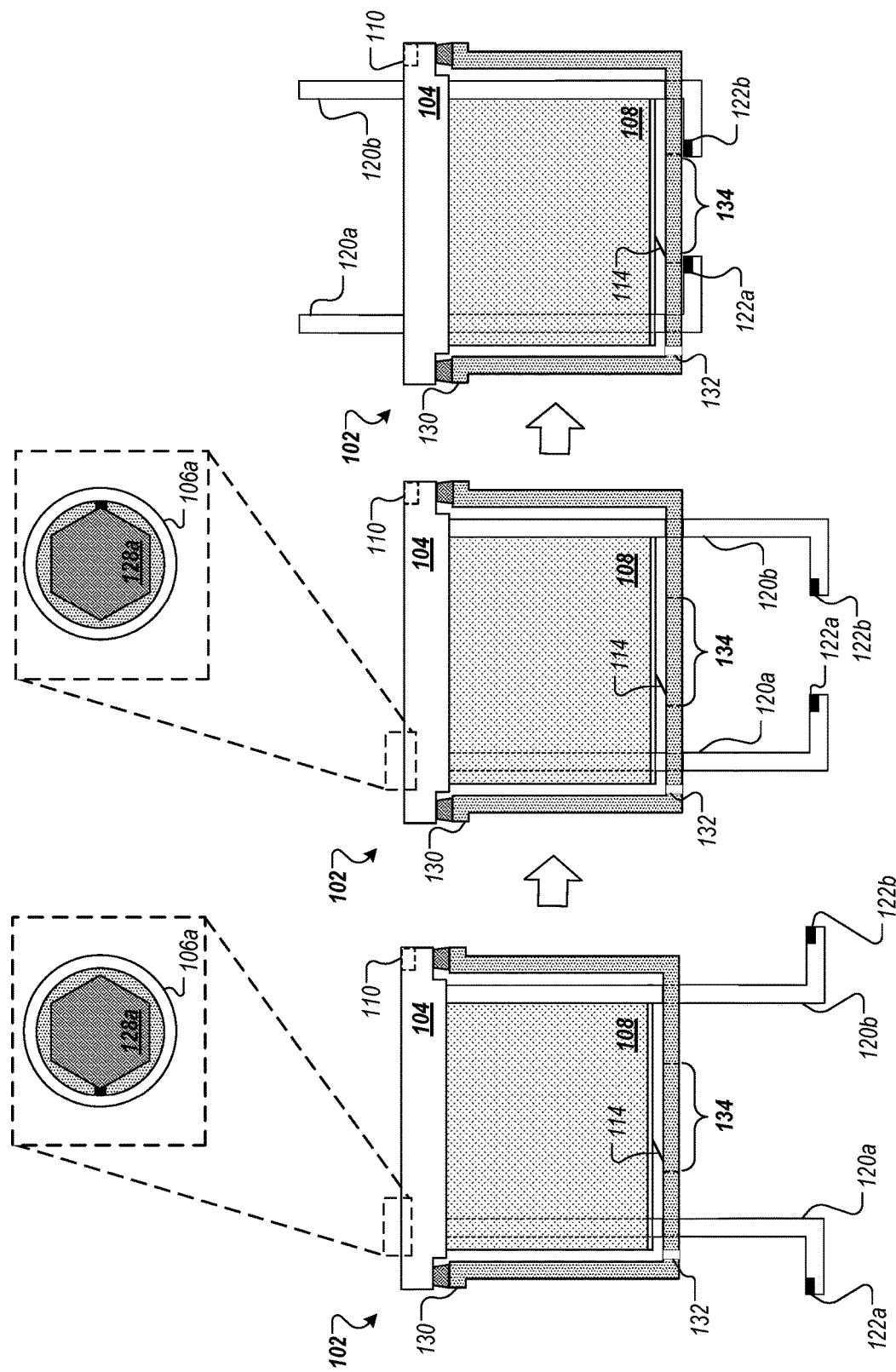

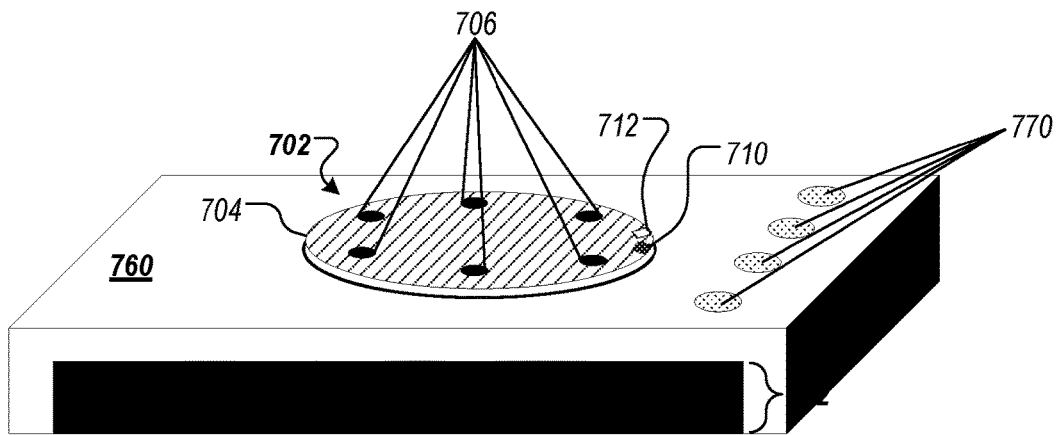
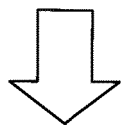
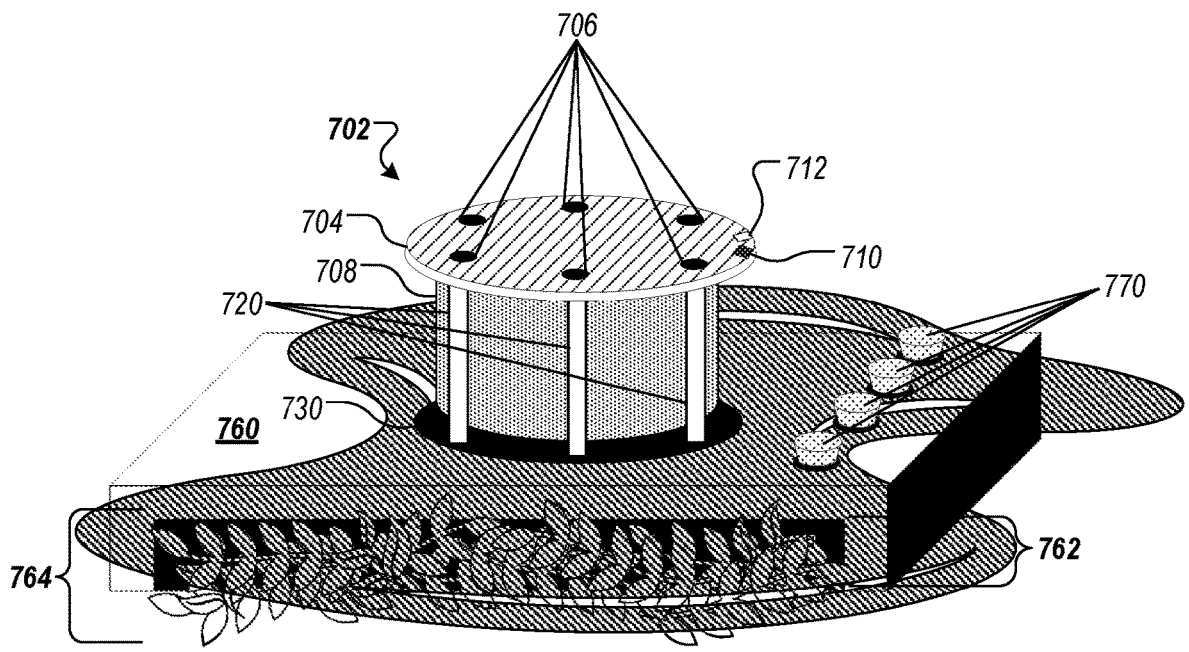
FIG. 7

DETECTING AND ALLEVIATING FLOODING AND BLOCKED STORM SEWERS

CROSS-REFERENCE TO RELATED APPLICATIONS

This application claims the benefit of U.S. Provisional Application No. 62/980,597, filed Feb. 24, 2020, and titled "DETECTING AND ALLEVIATING FLOODING AND BLOCKED STORM SEWERS," which is incorporated by reference in its entirety.

BACKGROUND

Localized flooding can occur due to debris blocking a storm sewer opening. Storm sewers frequently have manhole covers made from cast iron or steel.

SUMMARY

Localized flooding may be reduced by replacing a drain cover, such as a traditional manhole cover, with a device including a cover having an attached float body and a canister. When flooding occurs, e.g., due to a sewer opening being blocked, the canister accumulates water which, in turn, causes the cover and float body to rise. The cover and/or float body is secured to a valve in the canister such that when the cover and float body rise, the valve is opened. Once opened, the valve allows water collected in the canister and/or flowing into the canister to drain, e.g., into an underlying sewer system.

In some implementations, the device includes a transmitter. The transmitter may be able to send a signal to one or more external systems, such as a monitoring system and/or an emergency services system. The signal may indicate the presence of flooding where the apparatus is located. The transmitter may be triggered when the float body rises, e.g., a switch is actuated when the float body rises to a particular height which triggers the transmitter, or a spring-loaded mechanism triggers the transmitter when the manhole cover rises above its seat.

In some implementations, the device includes a set of guides secured to the cover that help to maintain the orientation of the cover as it rises with the float body and prevent the cover and float body from detaching from the drainage opening, e.g., a sewer opening. The guides may also provide some filtering by, for example, preventing people, objects, and larger debris from falling into the canister. In some implementations, one or more of the guides include a set of teeth that can engage a corresponding ratchet of the canister. Once engaged, the ratchet and the set of teeth keep the manhole cover and the float body in the raised position, and the valve open, until the manhole cover and float body are manually lowered.

In some implementations, the device includes a strobe light to notify persons that the cover and float body are in a raised position. The strobe light can be triggered in the same manner as the transmitter. The strobe light itself might separate from the device and be capable of floating on the surface of the flood water. For example, if the flood waters are higher than the raised cover and float body, the strobe light might separate from the manhole cover to reach the water surface while being secured to the device through a tether or cable.

In one general aspect, a device includes: a manhole cover; a float body coupled to the manhole cover; a canister that includes an interior section and a valve formed in the interior section, the interior section is configured to receive the float body when the manhole cover is in a resting position, the valve is configured to allow liquid in the interior section to flow through a primary opening in a bottom surface of the canister when the valve is opened and configured to substantially prevent liquid in the interior section to flow through the primary opening when the valve is closed; and multiple float guides coupled to the manhole cover that pass through corresponding openings in the bottom surface of the canister, the multiple float guides are configured to connect the manhole cover to the canister, where the float body is configured to raise the multiple float guides and the manhole cover from the resting position with respect to the bottom surface of the canister as liquid collects in the interior section of the canister Implementations may include one or more of the following features. For example in some implementations, the valve is connected to the manhole cover or the float body, and the valve is configured to open when the float body raises the manhole cover.

In some implementations, the valve includes a first end pivotally coupled to the bottom surface of the canister and a second end connected to the manhole cover or the float body through a tether.

In some implementations, the canister includes a corrugated lip having upper portions and lower portions, the upper portions of the corrugated lip contact corresponding portions of the manhole cover when the manhole cover is in the resting position, and the lower portions of the corrugated lip define passages that extend from an exterior surface of the canister to the interior section of the canister, and are configured to allow liquid to flow through the passages into the interior section of the canister.

In some implementations, when the manhole cover is in the resting position, the manhole cover and the bottom surface define a space between the manhole cover and the bottom surface.

In some implementations, the device includes: a microprocessor; one or more sensors electronically coupled to the microprocessor, the one or more sensors configured to detect when the manhole cover reaches a raised position; and a wireless transmitter, where the microprocessor is configured to use the wireless transmitter to send a communication to an external computing system when a sensor of the one or more sensors detects that that the manhole cover has reached the raised position, the communication indicating at least one of that the manhole cover has reached the raised position or that there is flooding in an area where the device is located.

In some implementations, the one or more sensors include one or more contact sensors coupled to at least one of the multiple float guides, the canister includes a member configured to actuate the one or more contact sensors when the member is brought into contact with the one or more contact sensors, and the at least one float guide and the canister are configured such that when the float body raises the multiple float guides and the manhole cover to the raised position, the member of the canister is brought into contact with the one or more contact sensors, triggering the one or more contact sensors.

In some implementations, the one or more sensors include one or more spring-loaded switches disposed in a lip of the manhole cover, the one or more spring-loaded switches are configured to exert a force on a lip of the canister when the one or more spring-loaded switches are in a compressed position, and the one or more spring-loaded switches are triggered when the manhole cover reaches the raised position where the one or more spring-loaded switches are in an extended position.

In some implementations, the device includes a strobe light disposed in the manhole cover, where the microprocessor is configured to turn on the strobe light a sensor of the one or more sensors detects that that the manhole cover has reached the raised position.

In some implementations, the one or more sensors include (i) a first set of one or more sensors configured to detect when the manhole cover reaches a lower-raised position of the manhole cover and (ii) a second set of one or more sensors configured to detect when the manhole cover reaches a higher-raised position of the manhole cover, the lower-raised position of the manhole cover is higher than a resting position of the manhole cover with respect to the bottom surface of the canister such that a space between a lip of the manhole cover and a lip of the canister is greater when the manhole cover is in the lower-raised position when compared to the resting position, and the higher-raised position of the manhole cover is higher than the lower-raised position of the manhole cover with respect to the bottom surface of the canister such that the space between a lip of the manhole cover and a lip of the canister is greater when the manhole cover is in the higher-raised position when compared to the lower-raised position.

In some implementations, the microprocessor is configured to use the wireless transmitter to send a first communication to an external computing system when a sensor of the first set of one or more sensors detects that that the manhole cover has reached the lower-raised position, the communication indicating at least one of that the manhole cover has reached the lower-raised position or that there is a first degree of flooding in an area where the device is located, the microprocessor is configured to use the wireless transmitter to send a second communication to an external computing system when a sensor of the second set of one or more sensors detects that that the manhole cover has reached the higher-raised position, the communication indicating at least one of that the manhole cover has reached the higher-raised position or that there is a second degree of flooding in an area where the device is located, the first degree of flooding and second degree of flooding indicate a severity of flooding, and the second degree of flooding is greater than the first degree of flooding, indicating more severe flooding.

In some implementations, the device includes a GPS unit, where the microprocessor is configured to identify a location of the device using the GPS unit, and where the microprocessor is configured to include the location in communications sent to the external computing system.

In some implementations, the canister includes a ratchet formed in the interior section of the canister, one or more of the multiple float guides include a set of teeth configured to receive the ratchet, and the canister and the one or more float guides are configured such that when the float body raises the multiple float guides and the manhole cover to a raised position, the ratchet of the canister engages the one or more sets of teeth, preventing the manhole cover from lowering from the raised position with respect to the bottom surface of the canister.

In some implementations, the device includes: a microprocessor; one or more sensors electronically coupled to the microprocessor, the one or more sensors configured to detect when debris is collecting around the manhole cover; and a debris removal device configured to move debris collected around the manhole cover away from the manhole device, where the microprocessor is configured to activate the debris removal device when a sensor of the one or more sensors detects that debris has collected around the manhole cover.

In some implementations, the debris removal device is a fan configured to move air (i) through one or more spaces between a lip of the manhole cover and a lip of the canister and (ii) away from the device when the fan is turned on.

In some implementations, the debris removal device includes a compressed air canister, and the debris removal device is configured to move air released from the canister (i) through one or more spaces between a lip of the manhole cover and a lip of the canister and (ii) away from the device when the debris removal device is activated.

In some implementations, the multiple float guides are L-shaped with (i) first sections that are disposed primarily in the interior section of the canister and that pass through the corresponding openings in the bottom surface of the canister and (ii) second sections that are shorter than the first sections and substantially perpendicular with respect to the first sections.

In some implementations, the multiple float guides include first ends that are coupled to the manhole cover when the multiple float guides are in a locked position, and second ends that include magnets, and the canister is made from a ferromagnetic metal.

In some implementations, the multiple float guides and the manhole cover are configured to allow the multiple float guides to pass through the manhole cover and to be raised independently of the manhole cover when the multiple float guides are in an unlocked position, and the magnets of the multiple float guides magnetically couple the multiple float guides to an exterior surface of the canister when the multiple float guides are in an unlocked and raised position, holding the multiple float guides in the unlocked and raised position.

In some implementations, the device includes: a second float body disposed in the manhole cover and secured to the manhole cover through a cable; and a strobe light disposed in the second float body, where the second float body is configured to detach from the manhole cover while remaining secured to the manhole cover through the cable when the manhole cover is submerged.

The device can help to improve safety and prevent damage to infrastructure caused by flooding, for example, helping to alleviate flooding where the device is located, decreasing the length of time that an area where the device is located is flooded for, electronically notifying emergency services and others of the presence of flooding, and visually notifying persons near the device when the manhole cover and float body are in a raised position.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 5A-5C are diagrams that illustrate an example process for removing a device for detecting and alleviating flooding and blocked storm sewers.

FIG. 7 is a diagram that illustrates an example device for detecting and alleviating flooding and blocked storm sewers and example devices for further alleviating blocked storm sewers.

Like reference numbers and designations in the various drawings indicate like elements.

DETAILED DESCRIPTION

A traditional manhole cover can be replaced with a device including a manhole cover having an attached float body and a canister. When flooding occurs, e.g., due to a sewer opening being blocked, the canister accumulates water which, in turn, causes the float body to rise. The float body is secured to a valve in the canister such that when the float body rises the valve is opened. Once opened, the valve allows water to flow from the canister into the sewer system. The device may also include multiple guides to help maintain the orientation of the manhole cover as it rises with the float body and prevent the manhole cover and float body from detaching from the sewer opening, a transmitter to notify one or more external systems, and/or a strobe light to notify nearby persons when the manhole and float body are in a raised position.

This device can help to improve safety and prevent damage to infrastructure caused by flooding. As an example, when flooding occurs in the vicinity of the device, the manhole cover and float body of the device rises and the valve in the canister is opened, thereby facilitating the flowing of water into the sewer system through the canister of the device. This device will be particularly helpful when nearby sewer openings are blocked with debris. By ridding the area of flooding and/or reducing the amount of time that an area is flooded for, the device helps to improve the safety of persons in the vicinity of device who might otherwise get hurt by objects hidden under the water and/or be infected by the flooded water. Similarly, by ridding the area of flooding and/or reducing the amount of time that an area is flooded for, the device helps to prevent damage or further damage to the infrastructure and property in the vicinity of the device. The device further improves safety by electronically notifying, for example, emergency personnel and residents in the area of the flood. The device can also help to prevent injury by notifying nearby persons that the manhole cover and float body are in a raised position through, for example, a strobe light.

Figure 1:
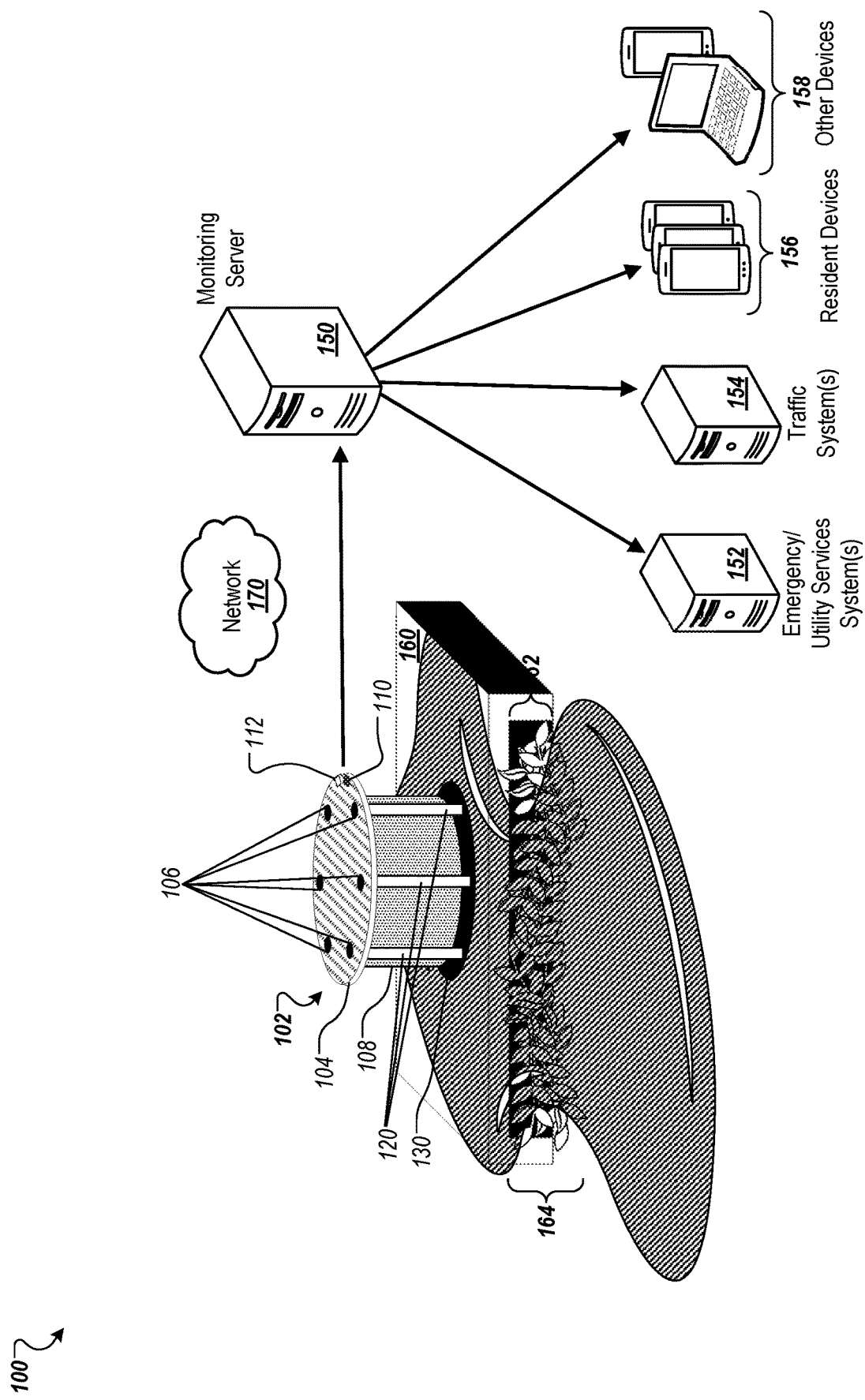
FIG. 1 is a diagram that illustrates an example system for detecting and alleviating flooding and blocked storm sewers.

FIG. 1 is a diagram that illustrates an example system 100 for detecting and alleviating flooding and blocked storm. The system includes a device 102 and a monitoring server 150 that can communicate with various external systems and devices 152-158.

The device 102 includes a manhole cover 104, a float body 108, float guides 120, a canister 130, a transmitter 110, and a strobe light 112. The float guides 120 are secured to the manhole cover 104 using, for example, bolts/sockets that pass through openings in recesses 106. The device 102 may transmit signals to the monitoring server 150 using the transmitter 110 over the network 170. These signals may indicate the presence of a flood at the device 102's location. These signals may also indicate an identification of the device 102 which the monitoring server 150 can use to lookup the location of the device 102, or a location of the device 102 (e.g., where the device 102 includes a GPS unit or memory where its location is stored). The device 102 may include a microprocessor to generate the signals. The device 102 may include one or more analog circuits to generate the signals. The device 102 can include a power source, such as a battery. Alternatively, the device 102 may receive power through a wired connection to an electrical grid.

In some implementations, the device 102 includes a battery that is charged using an onboard solar panel or a nearby solar panel.

In some implementations, the device 102 includes one or more antennae. For example, the device 102 can include a first antenna that is the transmitter 110. The device 102 can additionally include a second antenna that serves as a receiver, e.g., in order to receive signals from the monitoring server 150.

The monitoring server 150 may include one or more computers. The monitoring server 150 may include a server or a collection of servers. The monitoring server 150 may be part of a cloud computing platform. The monitoring server 150 may communicate with the device 102 and/or the external systems and devices 152-158 through a network 170.

The network 170 can include public and/or private networks and can include the Internet. The network 170 can be a cellular network.

The external systems and devices 152-158 include emergency/utility services system(s) 152, traffic system(s) 154, devices of residents 156, and other devices 158. Each of the external systems and devices 152-158 may communicate with the monitoring server over the network 170.

In some implementations, the system 100 does not include the monitoring server 150. The device 102 may directly transmit signals to the one more of the external systems and devices 152-158, e.g., to notify them of the presence of a flood at the device 102's location.

The emergency/utility services system(s) 152 may include, for example, one or more systems belonging to first responders, emergency medical technicians, utility services (e.g., water or sewer services of the local government), or the like. The emergency/utility services system(s) 152 may include one or more computers, a server, a collection of servers, and/or be part of a cloud computing platform. The traffic system(s) 154 may include one or more systems for traffic management, such as, for example, a traffic management center of the local government. The traffic system(s) 154 may include one or more computers, a server, a collection of servers, and/or be part of a cloud computing platform.

The resident devices 156 include one or more computing devices belonging to residents, e.g., residents who live near the device 102 or live near similar devices. The monitoring server 150 may determine the persons living near the device 102 or living near similar devices by accessing the property records of the local government. The resident devices 156 may include, for example, one or more laptop computers, desktop computers, tablet computers, mobile telephones, smart phones, or personal digital assistants (PDAs). The other devices 158 may include devices belonging to those other than residents who live near the device 102 or live near similar devices. For example, the other devices 158 may include devices belonging to persons who have signed up, e.g., through a mobile application or website, to receive notifications from the monitoring server 150. The other devices 158 may include, for example, one or more laptop computers, desktop computers, tablet computers, mobile telephones, smart phones, or personal digital assistants (PDAs).

As shown, a curb inlet 160 with a rectangular opening 162 has been blocked with debris 164, resulting in the area near the device 102 becoming flooded. Water has entered an interior section of the canister 130, causing the manhole cover 104, the float body 108, and the guides 120 to rise such that the device 102 is in a raised position. As will be discussed in more detail below, when the device 102 is in a raised position, water is able to flow into the sewer system through the interior section of the canister 130.

The device 102 may send one or more signals to the monitoring server 150 using the transmitter 110 when the device 102 is in a raised position, when the manhole cover 104 has been raised above its resting position, and/or when the manhole cover 104 has reached a particular height with respect to its resting position. The signal sent to the monitoring server 150 may indicate that flooding has occurred. For example, the signal sent to the monitoring server 150 may be binary signal have a value of one, where one corresponds to the device 102 being in a raised position and, therefore, indicates that flooding is present in the area where the device 102 is located. The one or more signals sent to the monitoring server 150 may additionally include an indication of an identification of the device 102 or a location (e.g., coordinates, or the closest address) of the device 102. For example, the monitoring server 150 may use the received identification to look up the location of the device 102. Alternatively, the location of the device 102 may be determined by the device 102 accessing a stored location in onboard memory, or may be outputted by an onboard GPS unit of the device 102.

In some implementations, the one or more signals include an indication of the severity of the flooding. For example, a first level of flooding may correspond with the device 102 detecting that the manhole cover 104 has risen above its resting position. Where a second, more severe level of flooding corresponds with the device 102 detecting that the device 102 has reached a raised position, e.g., when a ratchet of the canister 130 has engaged or is near engaging a set of teeth of one or more of the guides 120.

As will be discussed in more detail below, there may also be multiple raised positions. For example, each raised position may correspond with a particular ratchet tooth. Alternatively, there may be a lower raised position when a ratchet of the canister 130 first engages or is sufficiently close to engaging a set of teeth of one or more of the guides 120, and a higher raised position when the ratchet engages the last tooth in the set of teeth of the one or more guides, or disengages the set of teeth of the one or more guides due to the one or more guides rising above the ratchet of the canister 130.

The transmitter 110 may periodically send signals to the monitoring server 150, e.g., once a day, once a week, once a month, or the like. These periodic signals may indicate that the device 102 is working properly. As an example, a periodic signal sent to the monitoring server 150 may be a binary signal having a value of zero, where zero corresponds to the device 102 being in a resting position and, therefore, indicates that flooding is not present in the area where the device 102 is located The device 102 may turn on the strobe light 112 when the device 102 is in a raised position, when the manhole cover 104 has been raised above its resting position, and/or when the manhole cover 104 has reached a particular height with respect to its resting position.

When the monitoring server 150 receives the one or more signals from the device 102, it may generate or retrieve notifications to send to one or more of the external systems and devices 152-158. For example, the monitoring server 150 may access one or more stored lists of complete and/or incomplete notifications. These notifications may correspond to the party that is meant to receive them. For example, there may be a list of notifications containing notifications that are to be sent to the emergency/utility services system(s) 152, a list of notifications containing notifications that are to be sent to the traffic system(s) 154, a list of notifications containing notifications that are to be sent to the resident devices 156, and/or a list of notifications containing notifications that are to be sent to the other devices 158.

Based on the received one or more signals, the monitoring server 150 may determine a location of the device 102. Using the location of the device 102, the monitoring server 150 may identify a subset (e.g., one or more) of the emergency/utility services system(s) 152 that correspond to the area where the device 102 is located, identify the traffic system of the traffic system(s) 154 for the area where the device 102 is located, identify a subset of the resident devices 156 belonging to residents living in the area where the device 102 is located, and/or identify a subset of the other devices 158 belonging to persons have signed up to receive notifications for the area where the device 102 is located or for the device 102 itself. The monitoring server 150 may proceed to generate or retrieve notifications to send to each of the one or more systems and/devices in the identified subsets. Finally, the monitoring server 150 may send the generated and/or retrieved notifications to each of the one or more systems and/devices in the identified subsets, e.g., over the network 170.

In some implementations, the monitoring server 150 is dedicated to a specific location corresponding to the device 102. The emergency/utility services system(s) 152 may be those corresponding to the area where the device 102 is located, the traffic system(s) 154 may be the traffic system corresponding to the area where the device 102 is located, the resident devices 156 may belong to only those residents living in the area where the device 102 is located, and other devices 158 may belong to those persons who have signed up to receive notifications for the device 102 and/or for the area where the device 102 is located. Accordingly, when the monitoring server 150 receives the one or more signals from the device 102, it may generate or retrieve notifications to send to each of the external systems and devices 152-158.

The notifications generated and/or retrieved by the monitoring server 150 may depend on the detected severity of the flooding indicated by the received signals. For example, the monitoring server 150 may generate and send the following notification to a subset of resident devices 156 when the received one or more signals indicate a first or lower level of flooding: "Be careful. There may be some minor flooding near your area." However, if the received one or more signals indicate a higher level of flooding, the monitoring server 150 may generate and send the following notification to the subset of resident devices 156: "Warning! Severe flooding has been detected in your area. Please stay indoors."

Similarly, the systems and/or devices of the external systems and devices 152-158 notified by the monitoring server 150 may depend on the detected severity of the flooding indicated by the received signals. For example, when the one or more signals indicate a first or lower level of flooding, the monitoring server 150 may choose to only notify the utility service system(s) of the emergency/utility services system(s) 152 of the minor flooding. However, when the one or more signals indicate a higher level of flooding, the monitoring server 150 may choose to notify the utility service system(s) as well as the emergency service system(s) of the emergency/utility services system(s) 152 of the significant flooding.

In response to receiving a notification, the emergency/utility services system(s) 152 may notify personnel of the flooding and/or dispatch personnel to the location of the device 102.

In response to receiving a notification, the traffic system(s) 154 may notify personnel of the location of the flooding (e.g., the location of the device 102) and/or redirect traffic away from the area where the device 102 is located, e.g., depending on the detected severity of the flooding.

When a notification is sent to a device of the resident devices 156 or the other devices 158, an indication that the notification has been read, e.g., a read receipt, may be sent from the device to the monitoring server 150. This indication may be automatically sent upon the device owner reading the notification or may be sent in response to the device owner manually confirming that they have read the notification.

In some implementations, the device 102 replaces a cover other than a manhole cover. For example, the device 102 can replace other covers such as drain covers or cleanout covers, e.g., that are found in residential yards. The device 102 can have a smaller form factor than what is depicted in FIG. 1.

Figure 2A:
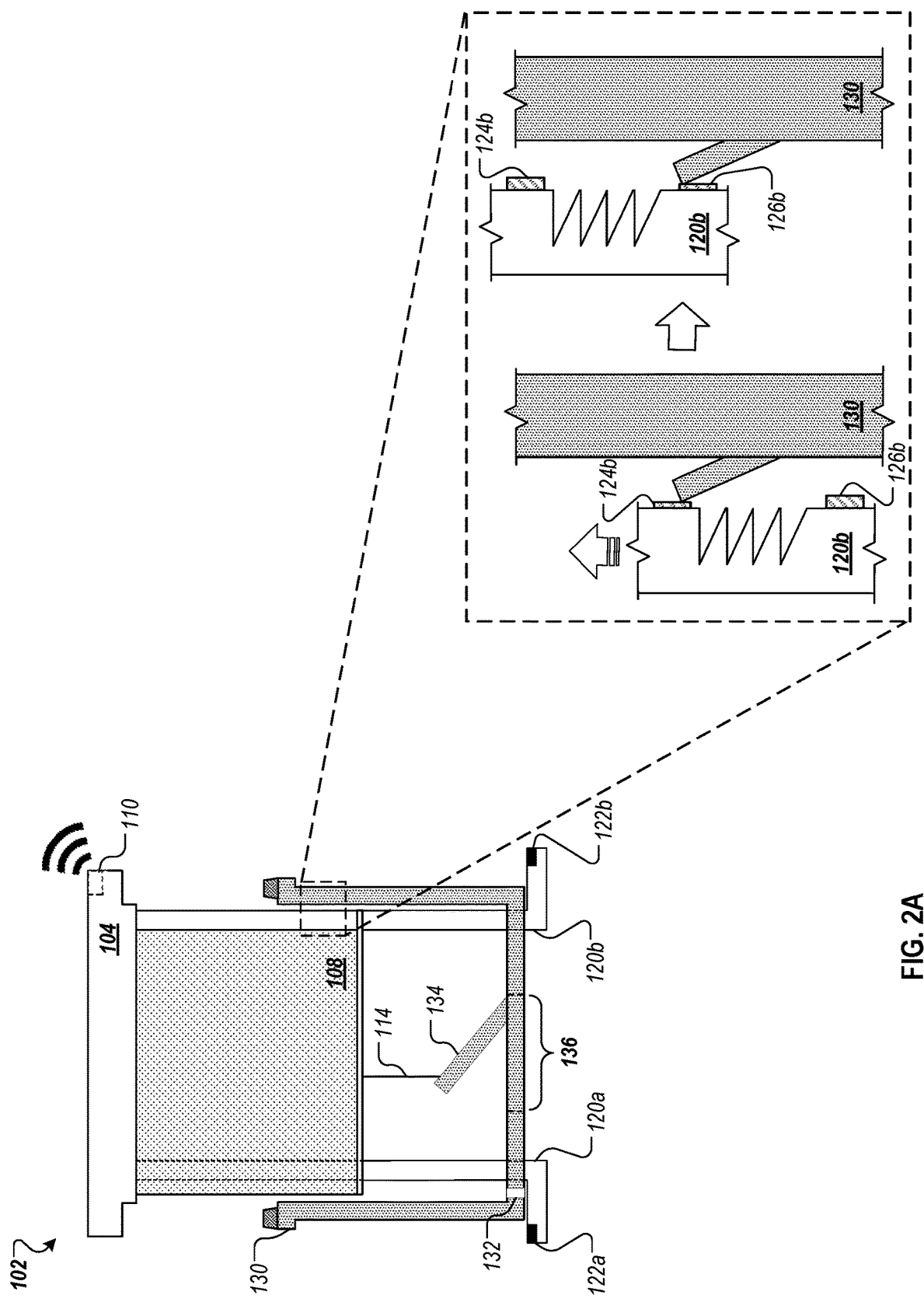
FIGS. 2A-2B are diagrams that illustrate an example device for detecting and alleviating flooding and blocked storm sewers.
Figure 2B:
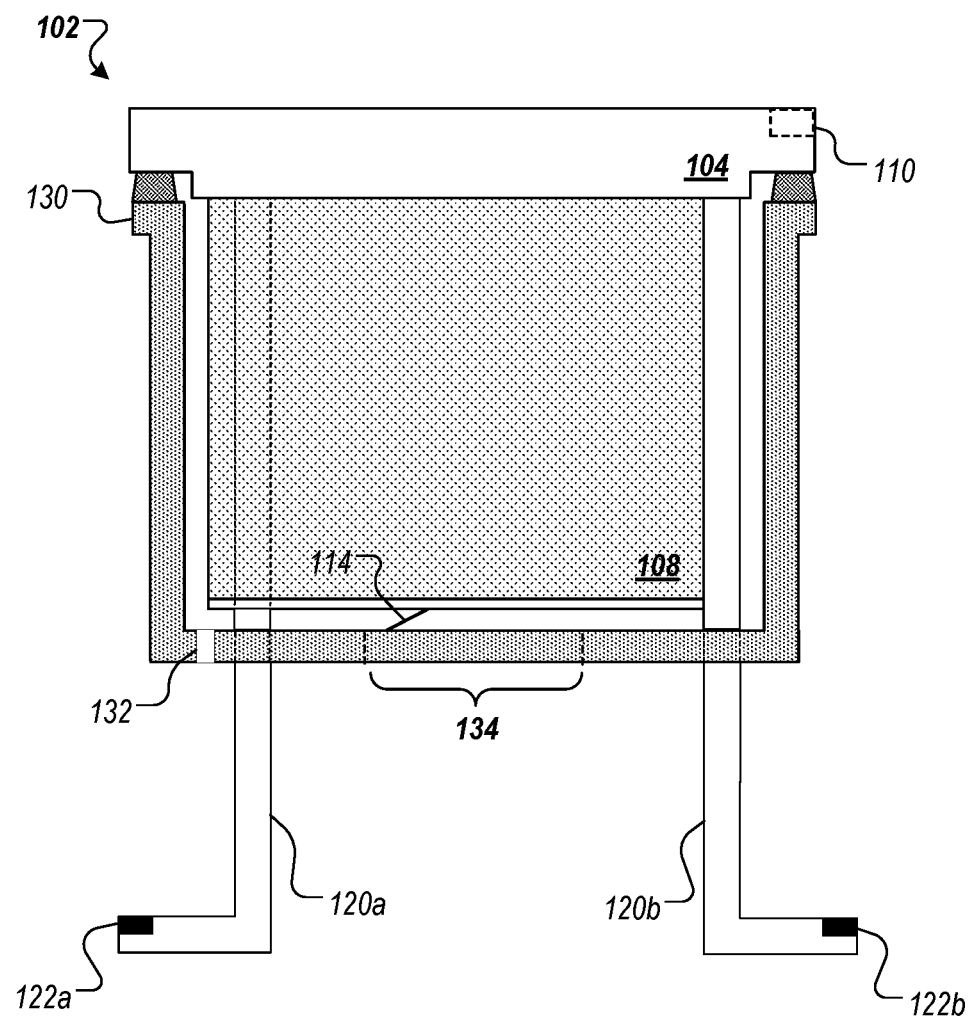

FIGS. 2A-2B are diagrams that illustrate the device 102 for detecting and alleviating flooding and blocked storm sewers.

FIG. 2A depicts the device 102 in a raised position and sending a signal through the transmitter 110. The device 102 includes a first L-shaped guide 120a with a magnet 122a, and a second L-shaped guide 120b with a magnet 122b. The canister 130 includes a drain hole 132 to let normal levels of water flow into the sewer system through the canister 130, e.g., due to normal rain. The canister 130 also contains an opening 136 that corresponds to a valve 134. The canister 130 includes an interior section that can collect liquid, such as water that flows into the canister 130. As described in more detail below, the interior section of the canister 130 includes an inside-bottom surface. The canister 130 also includes an exterior surface that, for example, may come into contact with the manhole that the device 102 is placed in and/or a corresponding portion of the curb inlet 160 that the device 102 is placed in. A primary opening 136 ("opening 136") may be formed in the inside-bottom surface of the canister 130 and can extend from the inside-bottom surface to the exterior surface of the canister 130.

The guides 120 may be L-shaped in order to catch the roof of a storm sewer, e.g., to catch the roof of the curb inlet 160 to the sewer. This will prevent the loss of the device 102 or part of the device 102 that might otherwise occur during flooding or severe flooding, e.g., without the guides 120 catching the roof of the sewer, there is a risk of the manhole cover 104, the float body 108, and the guides 120 being swept away by flood waters. The guides 120 may also assist in preventing unauthorized persons from removing the device 102 from the curb inlet 160.

The valve 134 can be configured to allow liquid such as water in the interior section of the canister 130 to flow through the opening 136 in the bottom surface of the canister 130 when the valve is opened and configured to prevent liquid in the interior section to flow through the opening 136 when the valve is closed. For example, with the device 102 in a raised position, the valve 134 is open. The valve 134 may be opened by means of a tether 114 secured to both the valve 134 and to a base of the manhole cover 104 or, alternatively, to the float body 108. The tether 114 may be a cable or string. The tether 114 may be a chain. The tether 114 may be secured to one side of the valve 134 while an opposing side of the valve 134 is secured to the canister through, for example, a hinge. As liquid collects in the interior section of the canister 130, the float body 108 is configured to raise the float guides 120 and the manhole cover 104. For example, the float body 108 may be constructed from a buoyant material, such as a foam, and include a sufficient amount of buoyant material so that when a sufficient amount of liquid enters the interior section of the canister 130 (e.g., a volume of water equal to or less than the volume of the canister 130 minus the volume of the float body 108) enough upward force is generated to lift the float guides 120 and the manhole cover 104 from the resting position. As the manhole cover 104 is raised, the manhole cover 104 exerts a force on the tether 114 which opens the valve 134. Once opened, liquid collected in the interior section of the canister 130 can flow out of the canister 130, e.g., into the sewer system below.

In contrast, when the manhole cover 104 is in a resting position, the valve 134 is closed. For example, in the closed position, the valve 134 may act as a lid on the opening 136 that prevents or substantially prevents liquid in the interior section of the canister 130 from flowing through the opening 136.

The manhole cover 104 may be in a resting position when there is no liquid in the interior section of the canister 130 or there is insufficient liquid in the interior section of the canister 130 to exert enough force on the float body 108 to raise the manhole cover 104 and the float guides 120. In the resting position, one or more portions of a lip of the manhole cover 104 may contact one or more corresponding portions of the canister 130 such that the weight of the manhole cover 104 and the guides 120 substantially rests on the portions of the lip of the canister 130. Here, a bottom of the float body 108 and/or a bottom of the manhole cover 104 may not contact the inside-bottom surface of the canister 130 so as to form a space between the inside-bottom surface of the canister 130 and/or the bottom of the float body 108. This space may assist in generating buoyancy on the float body 108 when liquid enters the interior section of the canister 130.

The guide 120b includes a first switch 124b and a second switch 126b. The guide 120b may be the only guide of the guides 120, including the guide 120a, to include switches. Alternatively, one or more of the other guides of the guides 120 may include one or more switches. For example, each guide of the guides 120, including the guide 120a, may include two switches. As will be discussed in more detail below, these switches may trigger various actions such as sending signals to the monitoring server 150 and/or an attempt to clear debris from a sewer opening.

The guide 120b also includes a set of teeth corresponding to a ratchet member of the canister 130, the set of teeth being located between the first switch 124b and the second switch 126b. The guide 120b may be the only guide of the guides 120 to include a set of teeth. Alternatively, one or more of the other guides of the guides 120 may include a similar set of teeth. For example, the guide 120a, on the opposite side of the device 102 with respect to the guide 120b, may also include a set of teeth that correspond with a ratchet of the canister 130. The ratchet of the canister 130 engages the teeth of the guide 120*b* and, thereby, prevents the guide 120*b* from lowering below this point. This, in turn, prevents the manhole cover 104 and the float body 108 from lowering below this point, e.g., until the manhole cover 104 and the float body 108 are manually lowered by emergency personnel or utility service personnel. The canister 130's ratchet may be located at a specific location that corresponds with the guide 120*b*. The canister 130 may contain multiple ratchets, each corresponding to a set of teeth of a specific guide. Alternatively, the canister 130's ratchet may extend through the entire inner surface of the canister 130 and, thereby, engage multiple sets of teeth of multiple guides.

While the device 102 is approaching the raised position such that the manhole cover 104, the float body 108, and the guides 120 are rising, the canister 130's ratchet comes into contact with the switch 124*b* of the guide 120*b* just before it engages the teeth of the guide 120*b*. Engaging the switch 124*b* may trigger a signal to be sent through the transmitter 110, e.g., to the monitoring server 150. The signal may indicate a first degree of flooding based on the height that the manhole cover 104 has been raised due to flooding as indicated by the switch 124*b* being triggered. For example, the signal may indicate that flooding is present in the area where the device 102 is located, that the device 102 is in a raised position, that the device 102 is in a lower-raised position, that the device 102 is in a middle-raised position, and/or that moderate flooding is occurring in the area where the device 102 is located. Engaging the switch 124*b* may trigger the strobe light 112 to turn on. Engaging the switch 124*b* may also trigger other actions. For example, with respect to FIG. 1, engaging the switch 124*b* may trigger a fan or propeller being turned on to attempt to remove the debris 164 from the opening 162 of the curb inlet 160, or debris collecting around the device 102 that may be preventing or slowing the flow of water into the canister 130. Similarly, engaging the switch 124*b* may trigger the release of compressed air in an attempt to remove the debris 164 from the opening 162 of the curb inlet 160, or debris collecting around the device 102 that may be preventing or slowing the flow of water into the canister 130.

As an example, a fan may be coupled to the manhole cover 104 and/or located within the float body 108. When turned on, the fan can move air (i) through one or more spaces between a lip of the manhole cover 104 and a lip of the canister 130 and (ii) away from the device 102. This may be used to, for example, move leaves or other debris that is preventing water from entering the interior section of the canister 130 or that is hampering water from entering the interior section of the canister 130.

As an example, a compressed air canister and multiple nozzles may be coupled to the manhole cover 104 and/or located within the float body 108. The nozzles may be aimed outward away from the device 102 and/or towards the lips of the manhole cover 104 and the canister 130. When a corresponding switch or sensor is activated, compressed air may be released from the canister and blown through the multiple nozzles so that air is moved (i) through one or more spaces between a lip of the manhole cover 104 and a lip of the canister 130 and (ii) away from the device 102. This may be used to, for example, move leaves or other debris that is preventing water from entering the interior section of the canister 130 or that is hampering water from entering the interior section of the canister 130.

In some implementations, a fan is located in the float body 108. When turned on, the fan can pull air from an opening in the manhole cover 104 or from an opening made in an upper portion of the float body 108. The float body 108 may house a motor, e.g., an electrical motor, used to power the fan. If the device 102 detects that flood water is sufficiently deep so as be at or above the height of the manhole cover 104 when the device 102 is in a raised or fully raised position, the device 102 may not attempt to turn on the fan.

In some implementations, a propeller is located in the float body 108. When turned on, the propeller can pull water from water located in the canister 130 and/or water that is present around a lower portion of the float body 108. The propeller can pull water from an opening in the base of the manhole cover 104 or from an opening in a lower portion of the float body 108. The float body 108 may house a motor, e.g., an electrical motor, used to power the propeller.

As the manhole cover 104, the float body 108, and the guides 120 continue to rise, the canister 130's ratchet passes the corresponding teeth of the guide 120*b* and comes into contact with the second switch 126*b* of the guide 120*b*. Engaging the switch 126*b* may trigger a signal to be sent through the transmitter 110, e.g., to the monitoring server 150. The signal may indicate a second degree of flooding that is greater than the first degree of flooding (e.g., therefore indicating more severe flooding) based on the triggering of the switch 126*b* indicating that the height that the manhole cover 104 has been raised due to flooding is greater than the height corresponding when the switch 124*b* is/was triggered. For example, the signal may indicate that flooding is present in the area where the device 102 is located, that the device 102 is in a raised position, that the device 102 is in a higher-raised position, and/or that severe flooding is occurring in the area where the device 102 is located. Engaging the switch 126*b* may trigger the strobe light 112 to turn on. Engaging the switch 126*b* may trigger a locking mechanism to release the strobe light 112. Engaging the switch 126*b* may also trigger other actions. For example, with respect to FIG. 1, engaging the switch 126*b* may trigger a fan being turned on to attempt to remove the debris 164 from the opening 162 of the curb inlet 160, or may trigger the fan being turned on again in a second attempt to remove the debris 164 from the opening 162 of the curb inlet. Similarly, engaging the switch 126*b* may trigger the release of compressed air in an attempt to remove the debris 164 from the opening 162 of the curb inlet 160, or may trigger another release of compressed air in a second attempt to remove the debris 164 from the opening 162 of the curb inlet. Engaging the switch 126*b* may trigger the release of compressed air in an attempt to remove debris collecting around the device 102 that may be preventing or slowing the flow of water into the canister 130, or may trigger another release of compressed air in a second attempt to remove the debris collecting around the device 102 that may be preventing or slowing the flow of water into the canister 130.

In some implementations, the device 102 includes another triggering mechanism in the manhole cover 104. This triggering mechanism may be spring loaded such that a spring exerts a downward force on a component in the lip of the manhole cover 104 towards a portion of the lip of the canister 130, e.g., when the spring-loaded triggering mechanism is in a compressed position. For example, the spring-loaded triggering mechanism may include one or more spring-loaded switches or sensors that are in a compressed position when the device is in a resting position such that a portion of the lip of the canister 130 is in contact with the manhole cover 104. As the canister 130 begins to fill up with water and the manhole cover 104 begins to rise as a result, the component is pushed out of the manhole cover 104 to reach an extended position, activating the switch(es) or sensor(s).

The activation of this switch(es) or sensor(s) may trigger a signal to be sent through the transmitter 110, e.g., to the monitoring server 150. The signal may indicate that flooding is present in the area where the device 102 is located, that the device 102 has begun to rise, that the device 102 is in a lower-raised position, and/or that minor flooding is occurring in the area where the device 102 is located. The activation of this switch or sensor may trigger the strobe light 112 to turn on. The activation of this switch or sensor may also trigger other actions. For example, with respect to FIG. 1, the activation of this switch or sensor may trigger a fan being turned on to attempt to remove the debris 164 from the opening 162 of the curb inlet 160. Similarly, the activation of this switch or sensor may trigger the release of compressed air in an attempt to remove the debris 164 from the opening 162 of the curb inlet 160, or debris collecting around the device 102 that may be preventing or slowing the flow of water into the canister 130.

The component in the lip of the manhole cover 104 may be a movable piece of the manhole cover 104, such as piece of metal that has a range of travel in a channel formed in the manhole cover 104 and that contacts a spring located in the channel. The spring may be compressed and allow the piece of metal to fully enter the channel so that the triggering mechanism is in the compressed position. For example, when the device 102 is in the resting position, the lip of the canister may press against the piece of metal, forcing the spring to compress and the triggering mechanism to be in the compressed position. However, as liquid enters the canister 130 and raises the manhole cover 104, the space between lip of the manhole cover 104 and the lip of the canister 130 increases and, thereby, allows the spring to push the piece of metal partially out of the channel. Once the piece of metal is pushed sufficiently far out of the channel, the triggering mechanism reaches the extended position and is triggered as a result. Once triggered, the triggering mechanism can generate a signal (e.g., indicating that the manhole cover 104 has raised and/or that flooding is occurring).

Similarly, the component may be a part of a spring-loaded switch or sensor that is located in a channel formed in the manhole cover 104. For example, the component may be a rod or plunger that has range of motion. A spring may be located within the spring-loaded switch or sensor and exert a force against the rod or plunger. When sufficient force is exerted on the rod or plunger, the spring is compressed and the rod or plunger can fully enter the channel so that the triggering mechanism is in the compressed position. For example, when the device 102 is in the resting position, the lip of the canister may press against the rod or plunger of a spring-loaded switch, forcing the spring to compress and the triggering mechanism to be in the compressed position. However, as liquid enters the canister 130 and raises the manhole cover 104, the space between lip of the manhole cover 104 and the lip of the canister 130 increases and, thereby, allows the spring to push the rod or plunger partially out of the channel. Once the rod or plunger is sufficiently far out of the channel and/or sufficiently extended, the triggering mechanism reaches an extended position and is triggered as a result. Once triggered, the triggering mechanism can generate a signal (e.g., indicating that the manhole cover 104 has raised and/or that flooding is occurring).

The triggering mechanism may include multiple components. For example, the triggering mechanism may include multiple spring-loaded switches that are positioned in multiple corresponding channels formed in the lip of the manhole cover 104.

In some implementations, one or more of the guides 120 include other switches or sensors that can detect when debris is collecting around the device 102. For example, each of the guides may include one or more switches that face outward towards a lip of the canister 130. These switches may be positioned on the guides such that they can rise above the canister 130, e.g., depending on the severity of the flooding. For example, each of the guides 120 may include a switch for detecting debris collecting around the device 102 that are positioned such that they are vertically above the lip of the canister 130 when the device 102 is in a raised position. These switches may be physically actuated by debris collecting around the device 102. Similarly, each of the guides 120 may include two switches for detecting debris collecting around the device 102. These switches can be positioned such that a first switch of each of the guides are located vertically above the lip of the canister 130 when the device 102 in a partially raised position (e.g., where mild or moderate flooding is occurring), and a second switch of each of the guides are located vertically above the lip of the canister 130 when the device 102 is in a raised or fully raised position (e.g., where severe flooding is occurring).

As an example, a raised position may correspond with a ratchet of the canister 130 reaching, or being sufficiently close to reaching, a corresponding first tooth of a set of teeth on one or more of the guides 120. A fully raised position may correspond with a ratchet of the canister 130 reaching, or passing, a corresponding last tooth of the set of teeth on the one or more guides. A partially raised position may correspond with the manhole cover 104 and the float body 108 rising above their resting position, and a ratchet of the canister 130 not reaching, or being insufficiently close to reaching, the first tooth of the set of teeth on the one or more guides.

FIG. 2B depicts the device 102 in a resting position with the valve 134 closed. With respect to FIG. 2A, the manhole cover 104, the float body 108, and the guides 120a-120b are all lower with respect to the canister 130.

When the device 102 is in a resting position, there is some space between base of the manhole cover 104 and the inside-bottom surface of the canister 130. This space can aid in the manhole cover 104 and the float body 108 achieving buoyancy as water flows into the canister 130. When the device 102 is in a resting position, the lip of the manhole cover 104 can come into contact with one or more portions of a lip of the canister 130, e.g., the upper portions of the lip of the canister 130. Accordingly, these one or more portions of the lip of the canister 130 can support the manhole cover 104 and the float body 108. For example, as will be described in more detail with respect to FIG. 3, the lip of the canister 130 may be corrugated with upper portions that engage the lip of the manhole cover 104 when the device 102 is in a resting position, and lower portions that allow water to enter the canister 130. As another example, the lip of the canister 130 can include a continuous flat surface on which the lip of the manhole cover 104 rests, and the canister 130 can include one or more openings below the lip of the canister 130 to allow water to flow into the canister. Similarly, the lip of the canister can include multiple teeth (e.g., rectangular or trapezoidal teeth) on which the lip of the manhole cover 104 rests. Where manhole cover 104 rests on the crests of the teeth, water can flow through the troughs of the teeth into the canister 130.

In some implementations, instead of being supported by one or more portions of the lip of the canister 130, the manhole cover 104 and float body 108 are supported by one or more pillars that are secured to or are part of the base of the manhole cover 104. These one or more pillars would come into contact with the inner-bottom surface of the canister 130 and, thereby, support the weight of the manhole cover 104 and float body 108.

Figure 3:
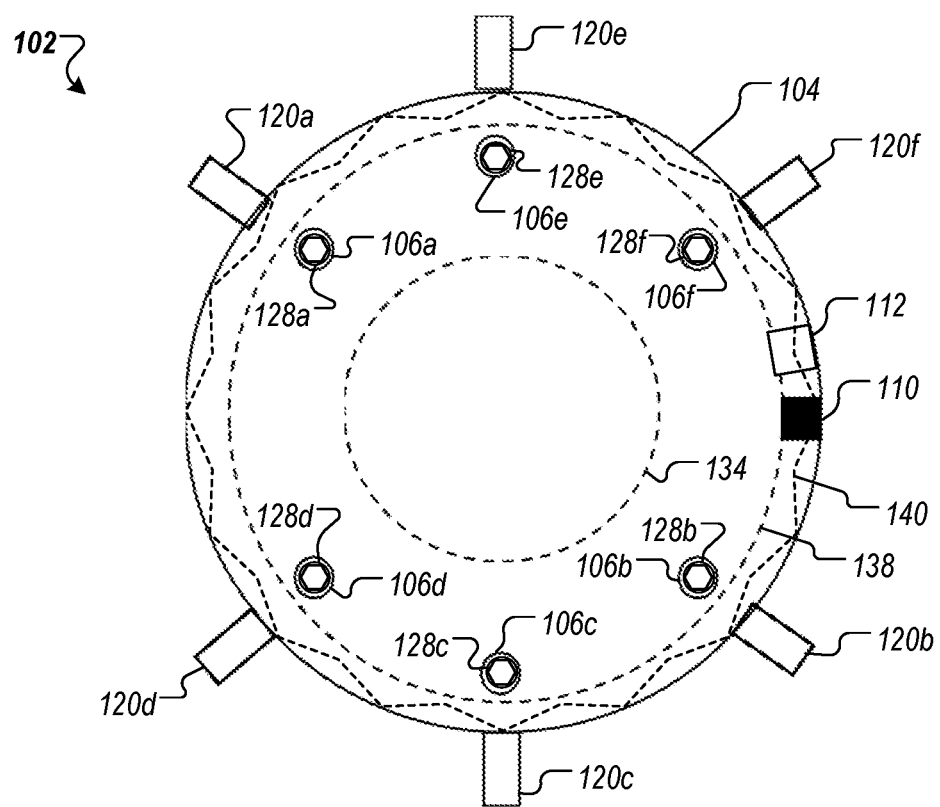
FIG. 3 is a diagram of a top view of an example device for detecting and alleviating flooding and blocked storm sewers.

FIG. 3 is a diagram of a top view of the device 102 for detecting and alleviating flooding and blocked storm sewers. The device 102 includes the transmitter 110, the strobe light 112, and six guides 120a-120f that each correspond to recesses 106a-106f and sockets 128a-128f, respectively. The sockets 128a-128f are part of, or secured to, the guides 120a-120f, respectively. The recesses 106a-106f each include an opening that allows a respective socket of the sockets 128a-128f to pass through. Each of the guides 120a-120f are secured to the manhole cover 104 using the sockets 128a-128f, respectively.

As an example, the sockets 128a-128f may be formed in an upper portion of the guides 120a-120f, respectively, such that when the sockets 128a-128f are rotated, the guides 120a-120f turn. The guides 120a-120f may also each include threads located between, or as part of, the sockets 128a-128f, respectively. These threads may correspond to internal threads in the openings of the recesses 106a-106f, such that the threads may be used to secure the guides 120a-120f to the manhole cover 104. When the sockets 128a-128f are rotated passed a certain degree or range of degrees, the guides 120a-120f may be released such that the guides may be able to travel further through the openings of the recesses 106a-106f, respectively. For example, if the guide 120a is rotated more than 180 degrees, 540 degrees, or 900 degrees, the guide 120a may be released such that a portion of the guide 120a can freely travel through the opening of the recess 106. The portion of the guide 120a may be able to travel in direction from a bottom surface of the manhole cover 104 through the upper surface of the manhole cover 104. The socket 128a and/or threads of the guide 120a may be configured such that they prevent the guide 120a from falling through the opening in the recess 106a, e.g., due to the socket 128a being larger than the opening in the recess 106a. Accordingly, even when the guide 120a is released it is still linked to the manhole cover 104.

In some implementations, the sockets 128a-128f are bolts that are screwed into the guides 120a-120f, respectively. The sockets 128a-128f may include threads that correspond to internal threads in the openings of the recesses 106a-106f, respectively, such that the threads may be used to secure the guides 120a-120f to the manhole cover 104.

The valve 134 is circular in shape. However, other shapes are possible. For example, the valve 134 may be semicircular in shape, may be rectangular in shape, may be oval in shape, or the like.

The canister 130 includes an inner wall surface 138 and an outer lip 140. The outer lip 140 is corrugated such that upper portions of the outer lip 140 contact the manhole cover 104 when the device 102 is in a resting position, and lower portions of the outer lip 140 continue to allow water to flow into the canister 130. For example, the lower portions of the outer lip 140 may define passages between the exterior surface of the canister 130 and the inner wall surface 138 of the canister 130. As such, water can flow through the passages and into an interior section of the canister 130 even when the device 102 is in the resting position. This allows liquid, such as water, to collect in the interior section of the canister 130 before there is sufficient liquid in the canister 130 to raise the float body 108 and, therefore, the manhole cover 104 and the float guides 120.

In some implementations, the outer lip 140 of the canister 130 is not corrugated. For example, the outer lip 140 may be consistent throughout angled toward the inside of the canister 130. When the device 102 is in a resting position, the outer lip 140 of the canister 130 may not contact the lip of the manhole cover 104. Instead, the base of the manhole cover 104 may rest on the bottom surface of the inside of the canister.

Figure 4:
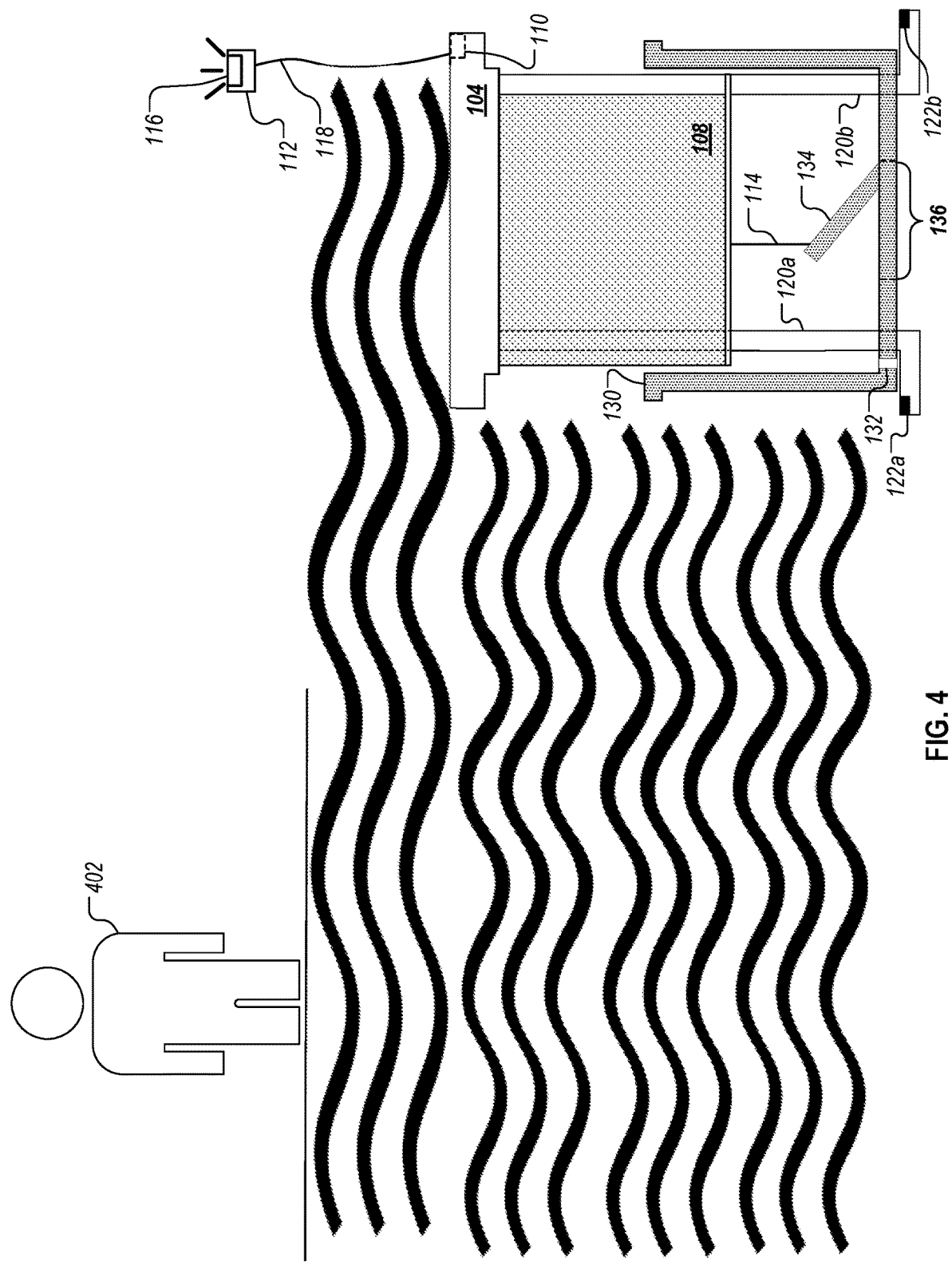
FIG. 4 is a diagram that illustrates an example device for detecting and alleviating flooding and blocked storm sewers in a flood.

FIG. 4 is a diagram that illustrates the device 102 for detecting and alleviating flooding and blocked storm sewers in a flood. The device 102 is in a raised position such that manhole cover 104, the float body 108, and the guides 120a-120b are each in an elevated position with respect to the canister 130. Accordingly, the valve 134 is open, allowing water to flow into the canister 130 and into the underlying sewer through the opening 136 in the canister 130.

Here, due to the severity of the flood, the strobe light 112 has detached from manhole cover 104. The strobe light 112 may have detached due it being buoyant and the manhole cover 104 being fully submerged. Alternatively, the strobe light 112 may have detached after a locking mechanism was engaged to unlock or release the strobe light. If the strobe light 112 was not already turned on, the strobe light 112 may automatically turn on when it detaches from the manhole cover 104, e.g., as might be detected using one or more sensors/switches such as a magnetic contact switch. The strobe light 112 is buoyant such that, once it is detached from the manhole cover 104, it floats on the surface of the water, alerting a nearby person 402 that the device 102 is in a raised position.

The strobe light 112 includes a lightbulb 116. The lightbulb 116 may be an LED. The lightbulb 116 may be a Xenon bulb. The strobe light 112 remains connected to the device 102, specifically the manhole cover 104, through a cable 118. The cable 118 may supply power to the strobe light 112. Alternatively, the strobe light 112 may include its own battery. In such cases, the cable 118 may be a tether, a string, or a chain.

In some implementations, the strobe light 112 includes one or more antennae for wireless communication. The one or more antennae can include a transmitter and/or receiver. For example, the strobe light 112 may use one or more antennae to communicate with other components of the device 102, e.g., a microprocessor of the device 102. The strobe light 112 may use one or more antennae to communicate with the monitoring server 150.

FIGS. 5A-5C are diagrams that illustrate an example process for removing the device 102 for detecting and alleviating flooding and blocked storm sewers.

FIG. 5A shows the device 102 in a resting and locked position. In this position, an indicator of each of the sockets 128 securing the guides 120 to the manhole cover 104 face an outer edge of the manhole cover 104. For example, the indicator of the socket 128a of the guide 120a in the recess 106a of the manhole cover 104 points towards an outer edge of the manhole cover 104. This indicator may correspond with an orientation of the L-shaped portion of the guide 120a containing the magnet 122a.

As an example, when the socket 128a is in this position, e.g., where the socket 128a's indicator is pointing towards the outer edge of the manhole cover 104, a threaded portion of the guide 120a and/or the socket 128a contacts one or more internal threads of the manhole cover 104 corresponding to an opening of the recess 106a. Accordingly, when the socket 128a is in this position, the guide 120a and the manhole cover 104 are interlocked.

FIG. 5B shows the device 102 in a resting and unlocked position. In this position, the sockets 128 securing the guides 120 to the manhole cover 104 are rotated such that their indicators point inward. For example, the socket 128a of the guide 120a in the recess 106a of the manhole cover 104 is rotated inward such that an indicator on the socket 128a points towards the center of the manhole cover 104. The socket 128a may have been rotated substantially 180 degrees, 540 degrees, or 900 degrees with respect to its position shown in FIG. 5A.

With the indicators of each of the sockets 128 pointing inward, the L-shaped portions of each of the guides 120 also face inward. For example, as shown, the L-shaped portions of the guides 120a-120b face inward towards each other.

As an example, when the socket 128a is in this position, e.g., where the socket 128a's indicator is pointing towards the center of the manhole cover 104, a threaded portion of the guide 120a and/or the socket 128a no longer contacts one or more internal threads of the manhole cover 104 corresponding to an opening of the recess 106a. Accordingly, when the socket 128a is in this position, the guide 120a and the manhole cover 104 are no longer interlocked.

In some implementations, unlocking the guides 120 allows for the device 102 to be reset. For example, with respect to FIG. 2A, the device 102 may be locked in a raised position due to the interactions of one or more ratchets of the canister interacting with teeth of one or more of the guides 120. The device 102 may be reset by a person, e.g., a first responder, turning the sockets 128 towards the center of the manhole cover 104 as this would turn the teeth of one or more of the guides 120 away from the one or more ratchets of the canister 130, and, thereby, allow the manhole cover 104 and float body 108 to drop so that the device 102 is placed in a resting position. The person may then rotate the sockets 128 back towards the outer edge of the manhole cover 104 to interlock the guides 120 and the manhole cover 104.

FIG. 5C shows the device 102 with the guides 120 raised. Here, each of the guides 120 have been raised to facilitate the removal of the device 102 from a sewer opening. A magnet on each of the guides 120 may assist in keeping the guides 120 in a raised position while the device 102 is being removed. For example, the canister 130 may be made from a magnetic material such as a ferromagnetic metal (e.g., iron). Alternatively, the canister 130 may include one or more magnets, e.g., permanent magnets, that attract the magnets 122 of the guides 120.

The magnet 122a of the guide 120a is attracted to the canister 130, or a portion of the canister 130, such that when the magnet 122a is sufficiently close to the bottom surface of the canister 130, the magnet 122a secures the guides 120a to the canister 130, thereby keeping the guide 120a in a raised position. Similarly, the magnet 122b of the guide 120b is attracted to the canister 130, or a portion of the canister 130, such that when the magnet 122b is sufficiently close to the bottom surface of the canister 130, the magnet 122b secures the guides 120b to the canister 130, thereby keeping the guide 120b in a raised position.

In some implementations, the guides 120 do not include magnets. The device 102 can include other components used to keep the guides 120 in a raised position, e.g., for when removing the device 102. For example, the device 102 may include multiple spring clips to hole the guides 120 in a raised position. These spring clips may be mounted on the bottom of the canister 130. There can be one or more spring clips for each of the guides 120. For example, there can be six spring clips mounted to the bottom of the canister 130, where each spring clip is capable of receiving the L-shaped portion of one of the guides 120 when the guides 120 are turned to face inwards.

The guides 120 may be raised by a person, e.g., a utility serviceman, who is removing the device 102 from a sewer opening. By having the L-shaped portions of the guides 120 facing inwards, the guides 120 will not catch on a roof of the sewer, and, thereby, will not prevent the person from removing the device 102. In addition, by having the guides 120 each in a raised position, the device 102 is made more compact which can help to ease the device 102's removal. Having the guides 120 in a raised position, also helps to keep the L-shaped portions of the guides 120 facing inwards during the removal of the device 102.

Each of the sockets 128 may include a detent to assist in raising the guides 120. For example, the socket 128a may include a detent that a tool can lock onto. Specifically, a person in the process of removing the device 102 may use a tool that locks onto the detent of the socket 128a, e.g., a socket wrench with a hexagon insert, to first rotate the guide 120a and then to lift the guide 120a until it reaches its raised position.

In some implementations, the guides 120 do not raise with respect to the manhole cover 104. For example, a person may remove the device 102 once the guides 120 have been rotated inward as shown in FIG. 5B.

In some implementations, the valve 134 is made from a magnetic material, such as iron, or is a magnet. The radius of the valve 134 may be sufficiently large so that the valve 134 overlaps at least part of the L-shaped portion of each of the guides 120 containing the magnets 122 when the guides 120 are turned inward.

Figure 6B:
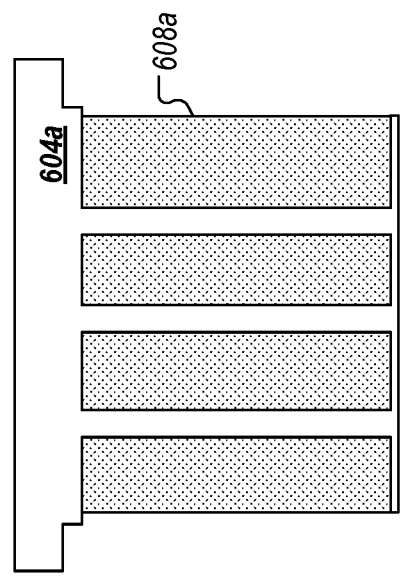
FIGS. 6A-6B are diagrams that illustrate a cross-section of a portion of a device for detecting and alleviating flooding and blocked storm sewers.
Figure 6A:
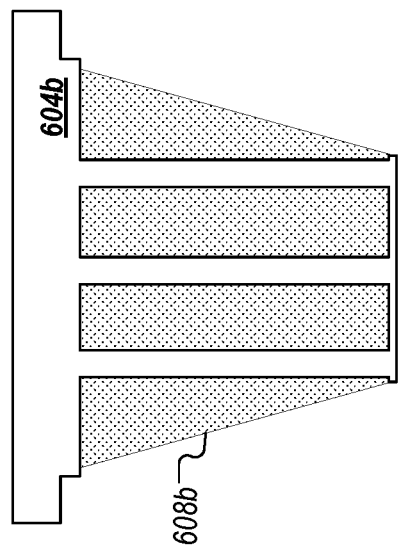

FIGS. 6A-6B are diagrams that illustrate a cross-section of a portion of a device for detecting and alleviating flooding and blocked storm sewers.

FIG. 6A shows a cross section of a manhole cover 604a having a float body 608a with a square cross-section. The manhole cover 604a may contain one or more !-beams for structural integrity. Here, the manhole cover 604a includes three I-beams.

The manhole cover 604a and float body 608a together have a density that is less that of water. The manhole cover 604a has a sufficient structural integrity for its application, e.g., non-traffic areas, medium duty areas, or the like. For example, the manhole cover 604a can have a structural integrity that is sufficient to handle 1000 lbs (e.g., corresponding to non-traffic areas), 18000 lbs (e.g., corresponding to medium duty areas), or the like.

The manhole cover 604a may be made out of a metal or an alloy, such as iron, steel, or other iron alloys. The manhole cover 604a may be made out of plastic, carbon fiber, or other composite materials. The manhole cover 604a may be solid. The manhole cover 604a may be hollow or partially hollow. For example, the lid (e.g., the upper portion) of the manhole cover 604a may be hollow.

The float body 608a may be made out of a buoyant material, such as a foam. For example, the float body 608a may be made of polyurethane foam.

In some implementations, the manhole cover 604a is the manhole cover 104 and the float body 608a is the float body 108 shown in FIGS. 1-5.

FIG. 6B shows a cross section of a manhole cover 604b having a float body 608b with a trapezoidal cross-section. The manhole cover 604b may contain one or more I-beams for structural integrity. Here, the manhole cover 604b includes three !-beams.

The manhole cover 604b and float body 608b together have a density that is less that of water.

The manhole cover 604b may be made out of a metal or an alloy, such as iron, steel, or other iron alloys. The manhole cover 604b may be made out of plastic, carbon fiber, or other composite materials. The manhole cover 604b may be solid. The manhole cover 604b may be hollow or partially hollow. For example, the lid (e.g., the upper portion) of the manhole cover 604b may be hollow.

The float body 608b may be made out of a buoyant material, such as a foam. For example, the float body 608b may be made of polyurethane foam.

In some implementations, the manhole covers 604a and/or 604b do not include I-beams.

In some implementations, the manhole covers 604a and/or 604b include a different number of I-beams. For example, the manhole covers 604a and/or 604b may include a single I-beam. The number of I-beams used in the manhole covers 604a and/or 604b may depend on the structural requirements for the particular manhole. For example, if the manhole cover 604a and/or 604b is for light duty/non-traffic applications, then the manhole cover 604a and/or 604b can include a single I-beam (or no I-beam). However, if the manhole cover 604a and/or 604b is for medium duty applications, the manhole cover 604a and/or 604b can include three or more I-beams.

FIG. 7 is a diagram that illustrates a device 702 for detecting and alleviating flooding and blocked storm sewers and devices 770 for further alleviating blocked storm sewers.

The device 702 includes a manhole cover 704, a float body 708, float guides 720, a canister 730, a transmitter 710, and a strobe light 712. The float guides 120 are secured to the manhole cover 704 using, for example, bolts/sockets that pass through openings in recesses 706.

Also shown, are the devices 770. Each device in the devices 770 are smaller in size, e.g., have a reduced diameter, when compared to the device 702. Each of the devices 770 include a float body that rises in water, e.g., when the surrounding area is flooded. The devices 770 may be embedded in a storm sewer roof. For example, as shown, the devices 770 are embedded in the curb inlet 760. The smaller diameter of each of the devices 770 compared to the device 702 allows the devices 770 to achieve positive buoyancy with float bodies that are not as deep as the float body 708 and/or without the need for internal I-beams. Accordingly, the reduced-size devices 770 may, when compared to the device 702, require less material and be simpler to manufacture.

One or more of the devices 770 may include a transmitter that can, for example, transmit signals to the monitoring server 150 over the network 170 shown in FIG. 1. These signals may indicate the presence of a flood at the location of the devices 770. These signals may also indicate identifications of each of the devices 770 or an identification corresponding to the group of devices 770. The monitoring server 150 can use these one or more identifications to lookup the location of the devices 770, or may receive an indication of the location of the devices 770 from one or more of the devices 770 (e.g., where one or more of the devices 770 includes a GPS unit or memory where its location is stored). One or more of the device 770 may include a microprocessor to generate the signals. One or more of the device 770 may include one or more analog circuits to generate the signals. One or more of the device 770 can include a power source, such as a battery. Alternatively, one or more of the device 770 may receive power through a wired connection to an electrical grid or through a wired connection to the device 702.

In some implementations, one or more of the devices 770 are electrically connected to the device 702, e.g., through a wired connection. The one or more devices may send a signal to the device 702 that indicates flooding has been detected, e.g., when a switch or sensor of the one or more devices is triggered as a result of the one or more devices being raised due to flooding in the area. The transmitter 710 of the device 702 may then be used to transmit the signals originating with the one or more devices, or to transmit a signal otherwise indicating that one or more of the devices 770 have detected flooding/have risen.

The devices 770 can include a float body and a tether, such as a cable, string, or chain, to prevent the devices 770 from being swept away.

In some implementations, the devices 770 only include a float body and a tether, such as a cable, string, or chain, to prevent the devices 770 from being swept away.

The devices 770 can each include a float body and a housing that is secured to the sewer opening. For example, the housing may be a cylinder or a truncated cone. The float body and housing may form a telescoping unit, such that the float body extends in the presence of water but remains linked to the housing.

In some implementations, the devices 770 are installed at sewer locations without the device 702.

As shown, a curb inlet 760 has a rectangular opening 762 that has been blocked with debris 764, resulting in the area near the device 702 and the devices 770 becoming flooded. Due to the flooding, water has entered the canister 730, causing the manhole cover 704, the float body 708, and the guides 720 to rise such that the device 702 is in a raised position.

When water is present in the area where the devices 770 are located, the devices 770 rise due to the buoyancy of their respective float bodies. In this raised position, each of the devices 770 allow water to pass beneath their respective float body and into the underlying sewer. As shown, the flooding causes the devices 770 to reach a raised position such that the devices 770 provide drainage in addition to that provided by the device 702.

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A manhole device comprising:
   a manhole cover;
   a float body coupled to the manhole cover;
   a canister that includes an interior section and a valve formed in the interior section, the interior section is configured to receive the float body when the manhole cover is in a resting position, the valve is configured to allow liquid in the interior section to flow through a primary opening in a bottom surface of the canister when the valve is opened and configured to substantially prevent liquid in the interior section to flow through the primary opening when the valve is closed; and
   multiple float guides coupled to the manhole cover that pass through corresponding openings in the bottom surface of the canister, the multiple float guides are configured to connect the manhole cover to the canister, wherein the float body is configured to raise the multiple float guides and the manhole cover from the resting position with respect to the bottom surface of the canister as liquid collects in the interior section of the canister.

2. The manhole device of claim 1, wherein:
the valve is connected to the manhole cover or the float body, and
the valve is configured to open when the float body raises the manhole cover.

3. The manhole device of claim 1, wherein the valve includes a first end pivotally coupled to the bottom surface of the canister and a second end connected to the manhole cover or the float body through a tether.

4. The manhole device of claim 1, wherein:
the canister includes a corrugated lip having upper portions and lower portions,
the upper portions of the corrugated lip contact corresponding portions of the manhole cover when the manhole cover is in the resting position, and
the lower portions of the corrugated lip define passages that extend from an exterior surface of the canister to the interior section of the canister, and are configured to allow liquid to flow through the passages into the interior section of the canister.

5. The manhole device of claim 1, wherein, when the manhole cover is in the resting position, the manhole cover and the bottom surface define a space between the manhole cover and the bottom surface.

6. The manhole device of claim 1, wherein:
the canister includes a ratchet formed in the interior section of the canister,
one or more of the multiple float guides include a set of teeth configured to receive the ratchet, and
the canister and the one or more float guides are configured such that when the float body raises the multiple float guides and the manhole cover to a raised position, the ratchet of the canister engages the one or more sets of teeth, preventing the manhole cover from lowering from the raised position with respect to the bottom surface of the canister.

7. The manhole device of claim 1, wherein the multiple float guides are L-shaped with (i) first sections that are disposed primarily in the interior section of the canister and that pass through the corresponding openings in the bottom surface of the canister and (ii) second sections that are shorter than the first sections and substantially perpendicular with respect to the first sections.

8. The manhole device of claim 1, comprising:
a second float body disposed in the manhole cover and secured to the manhole cover through a cable; and
a strobe light disposed in the second float body,
wherein the second float body is configured to detach from the manhole cover while remaining secured to the manhole cover through the cable when the manhole cover is submerged.

9. The manhole device of claim 1, comprising:
a microprocessor;
one or more sensors electronically coupled to the microprocessor, the one or more sensors configured to detect when the manhole cover reaches a raised position; and
a wireless transmitter,
wherein the microprocessor is configured to use the wireless transmitter to send a communication to an external computing system when a sensor of the one or more sensors detects that that the manhole cover has reached the raised position, the communication indicating at least one of that the manhole cover has reached the raised position or that there is flooding in an area where the manhole device is located.

10. The manhole device of claim 9, wherein:
the one or more sensors include one or more contact sensors coupled to at least one of the multiple float guides,
the canister includes a member configured to actuate the one or more contact sensors when the member is brought into contact with the one or more contact sensors, and
the at least one float guide and the canister are configured such that when the float body raises the multiple float guides and the manhole cover to the raised position, the member of the canister is brought into contact with the one or more contact sensors, triggering the one or more contact sensors.

11. The manhole device of claim 9, wherein:
the one or more sensors include one or more spring-loaded switches disposed in a lip of the manhole cover,
the one or more spring-loaded switches are configured to exert a force on a lip of the canister when the one or more spring-loaded switches are in a compressed position, and
the one or more spring-loaded switches are triggered when the manhole cover reaches the raised position where the one or more spring-loaded switches are in an extended position.

12. The manhole device of claim 9, comprising a GPS unit,
wherein the microprocessor is configured to identify a location of the manhole device using the GPS unit, and
wherein the microprocessor is configured to include the location in communications sent to the external computing system.

13. The manhole device of claim 9, comprising a strobe light disposed in the manhole cover,
wherein the microprocessor is configured to turn on the strobe light a sensor of the one or more sensors detects that that the manhole cover has reached the raised position.

14. The manhole device of claim 9, wherein:
the one or more sensors include (i) a first set of one or more sensors configured to detect when the manhole cover reaches a lower-raised position of the manhole cover and (ii) a second set of one or more sensors configured to detect when the manhole cover reaches a higher-raised position of the manhole cover,
the lower-raised position of the manhole cover is higher than a resting position of the manhole cover with respect to the bottom surface of the canister such that a space between a lip of the manhole cover and a lip of the canister is greater when the manhole cover is in the lower-raised position when compared to the resting position, and
the higher-raised position of the manhole cover is higher than the lower-raised position of the manhole cover with respect to the bottom surface of the canister such that the space between a lip of the manhole cover and a lip of the canister is greater when the manhole cover is in the higher-raised position when compared to the lower-raised position.

15. The manhole device of claim 14, wherein:
the microprocessor is configured to use the wireless transmitter to send a first communication to an external computing system when a sensor of the first set of one or more sensors detects that that the manhole cover has reached the lower-raised position, the communication indicating at least one of that the manhole cover has reached the lower-raised position or that there is a first degree of flooding in an area where the manhole device is located, the microprocessor is configured to use the wireless transmitter to send a second communication to an external computing system when a sensor of the second set of one or more sensors detects that that the manhole cover has reached the higher-raised position, the communication indicating at least one of that the manhole cover has reached the higher-raised position or that there is a second degree of flooding in an area where the manhole device is located, the first degree of flooding and second degree of flooding indicate a severity of flooding, and the second degree of flooding is greater than the first degree of flooding, indicating more severe flooding.

16. The manhole device of claim 1, comprising:

a microprocessor;

one or more sensors electronically coupled to the microprocessor, the one or more sensors configured to detect when debris is collecting around the manhole cover; and a debris removal device configured to move debris collected around the manhole cover away from the manhole device, wherein the microprocessor is configured to activate the debris removal device when a sensor of the one or more sensors detects that debris has collected around the manhole cover.

17. The manhole device of claim 16, wherein the debris removal device is a fan configured to move air (i) through one or more spaces between a lip of the manhole cover and a lip of the canister and (ii) away from the manhole device when the fan is turned on.

18. The manhole device of claim 16, wherein:

the debris removal device includes a compressed air canister, and the debris removal device is configured to move air released from the canister (i) through one or more spaces between a lip of the manhole cover and a lip of the canister and (ii) away from the manhole device when the debris removal device is activated.

19. The manhole device of claim 1, wherein:

the multiple float guides include first ends that are coupled to the manhole cover when the multiple float guides are in a locked position, and second ends that include magnets, and the canister is made from a ferromagnetic metal.

20. The manhole device of claim 19, wherein:

the multiple float guides and the manhole cover are configured to allow the multiple float guides to pass through the manhole cover and to be raised independently of the manhole cover when the multiple float guides are in an unlocked position, and the magnets of the multiple float guides magnetically couple the multiple float guides to an exterior surface of the canister when the multiple float guides are in an unlocked and raised position, holding the multiple float guides in the unlocked and raised position.

* * * * *

UNITED STATES PATENT AND TRADEMARK OFFICE
CERTIFICATE OF CORRECTION

PATENT NO. : 11,920,318 B2  
APPLICATION NO. : 17/184053  
DATED : March 5, 2024  
INVENTOR(S) : Donald Gerard Madden and Dana Eubanks Page 1 of 1

It is certified that error appears in the above-identified patent and that said Letters Patent is hereby corrected as shown below:

In the Claims

In Claim 9, Column 21, Line 65, delete "that that" and insert -- that --.

In Claim 13, Column 22, Line 39, delete "that that" and insert -- that --.

In Claim 15, Column 22, Line 66, delete "that that" and insert -- that --.

In Claim 15, Column 23, Line 8, delete "that that" and insert -- that --.

Signed and Sealed this  
Twenty-third Day of April, 2024

Katherine Kelly Vidal  
*Director of the United States Patent and Trademark Office*